Figure 1:
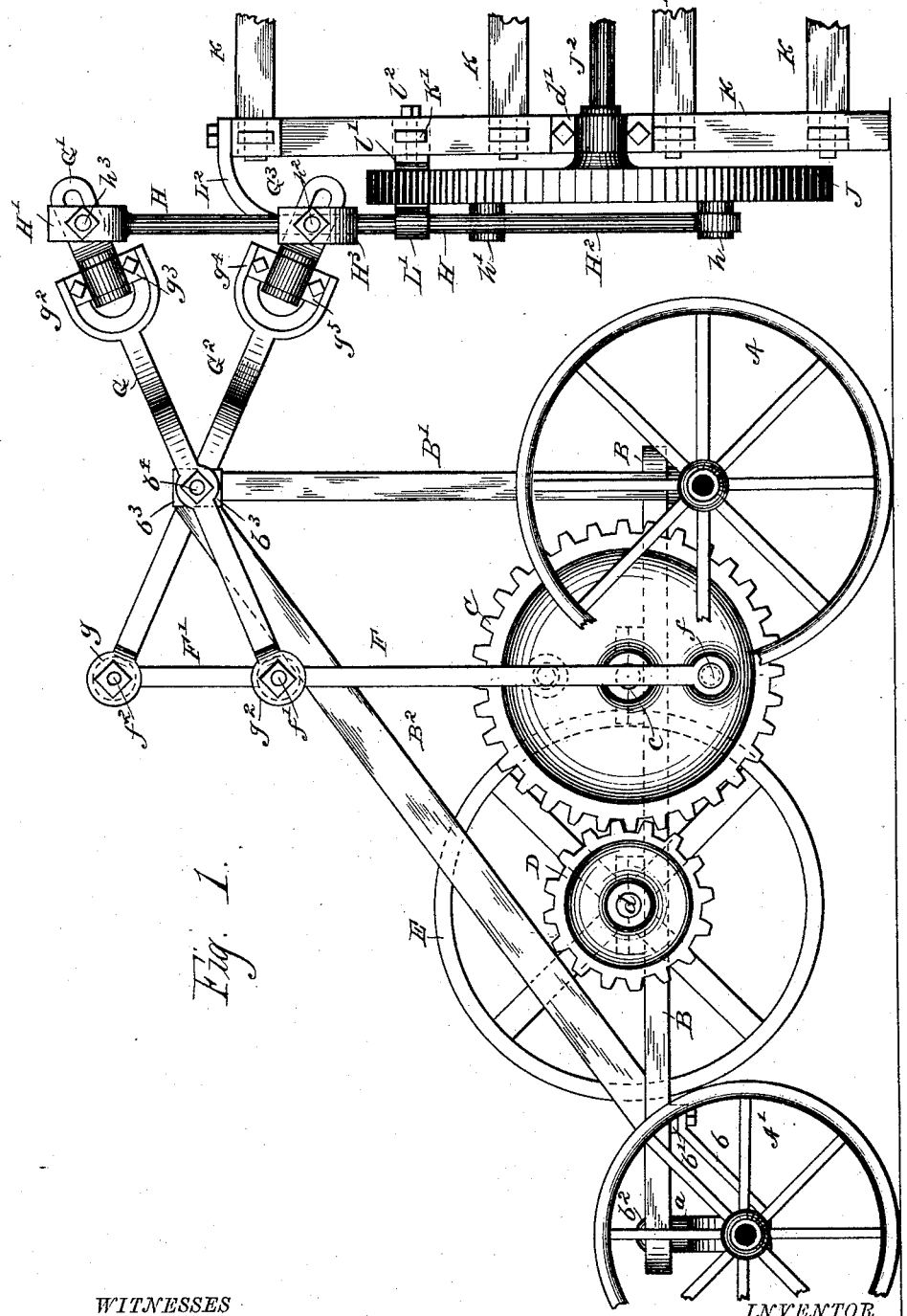

(No Model.) 4 Sheets—Sheet 1.
Z. R. FERGUSON.
POWER FOR CONVERTING MOTION.
No. 340,664. Patented Apr. 27, 1886.

WITNESSES
John C. Miller
Percy White

INVENTOR
Zuangle R Ferguson
by F. E. Fitzgerald
Attorney (No Model.) 4 Sheets—Sheet 3.
Z. R. FERGUSON.
POWER FOR CONVERTING MOTION.

No. 340,664. Patented Apr. 27, 1886.

WITNESSES
John C. Miller
Percy White

INVENTOR
Zuriangle R Ferguson
by H. E. Fitzgerald
Attorney (No Model.) 4 Sheets—Sheet 4.
Z. R. FERGUSON.
POWER FOR CONVERTING MOTION.
No. 340,664. Patented Apr. 27, 1886.
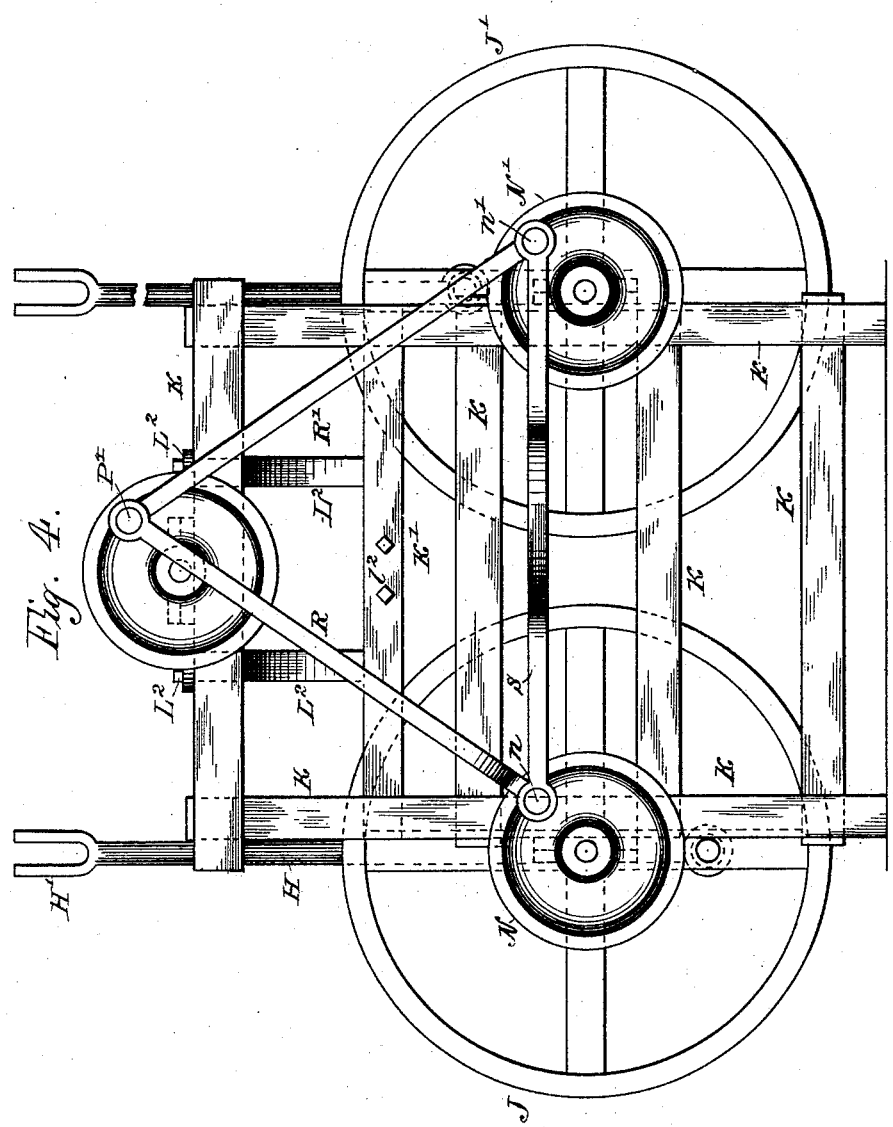

United States Patent Office.

ZUANGLE R. FERGUSON, OF EXCELSIOR, MISSOURI.

POWER FOR CONVERTING MOTION.

SPECIFICATION forming part of Letters Patent No. 340,664, dated April 27, 1886.

Application filed January 30, 1886. Serial No. 190,225. (No model.)

*To all whom it may concern:*

Be it known that I, ZUANGLE R. FERGUSON, a citizen of the United States of America, residing at Excelsior, in the county of Morgan and State of Missouri, have invented certain new and useful Improvements in Powers, of which the following is a specification, reference being had therein to the acccompanying drawings.

The object of this improvement is a device for converting reciprocating into rotary motion, and that is adapted to be transported from place to place and efficiently applied to driving thrashers and other agricultural machinery. These results are attainable by the mechanism illustrated in the drawings herewith filed as part hereof, in which the same letters of reference denote the same parts in the different views.

Figure 2:
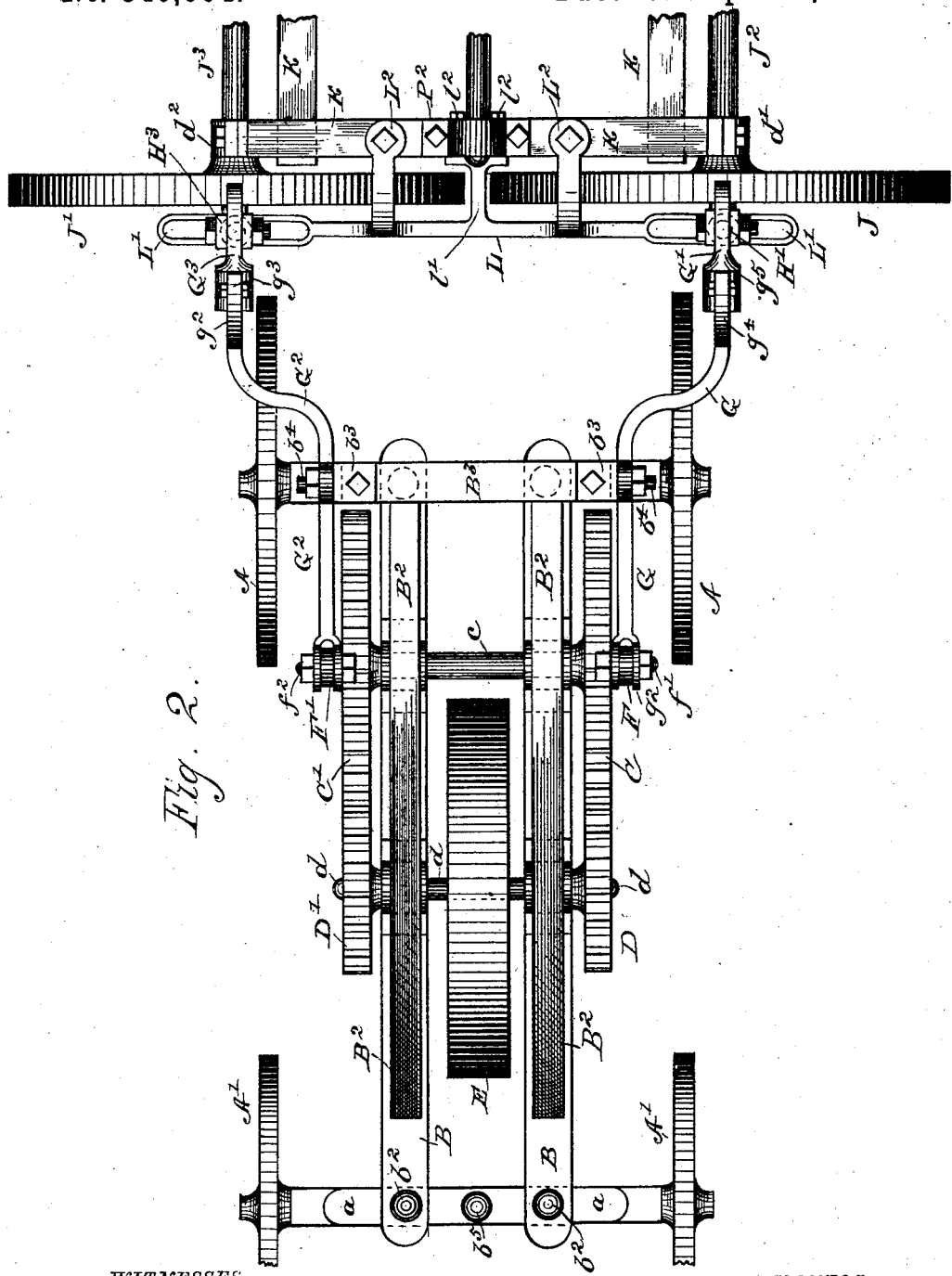
Figure 3:
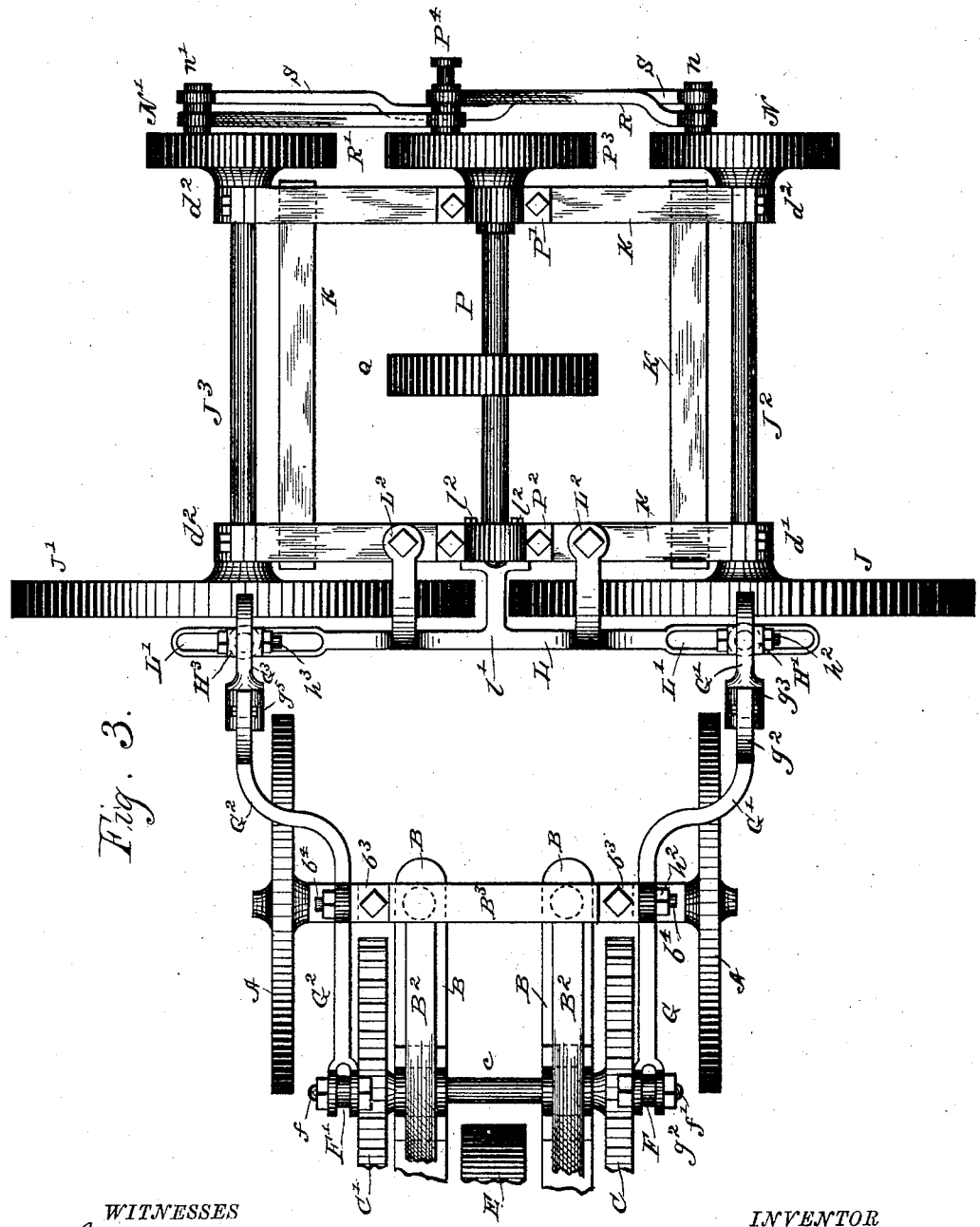

Figure 1 is a side elevation representing a portion of a device for converting motion embodying the features of my improvement. Fig. 2 is a plan view representing the parts shown in Fig. 1. Fig. 3 is a plan view with parts represented in Figs. 1 and 2 broken away more fully, showing parts broken away in said figures and their relation to each other. Fig. 4 is a rear elevation more fully illustrating the construction and the relation of the parts shown in Fig. 3 to the parts shown in Figs. 1 and 2.

Referring to Figs. 1 and 2, A A' are transporting-wheels having ordinary axles. The axle of the front wheels is provided with a bolster, $a$, connected to the axle by the usual king-bolt. (Shown at $b^5$.)

B B are beams rigidly secured to the rear axle and also to the bolster $a$ by bolts $b^2$.

B' are upright beams, fixed to the rear axle and suitably secured at their top ends to a transverse beam, $B^3$, which is provided at its ends with metal casings or caps $b^3$, provided with integral cylindrical projections $b^4$ and bolted at $b^3$ $b^3$ to the beam $B^3$.

$B^2$ $B^2$ are inclined beams suitably secured to the longitudinal beams B B and to the transverse beam $B^3$, for the purpose of rigidly bracing and securing the positions of uprights B' and transverse beam $B^3$.

E is a band-wheel fixed to the shaft $d$, having ordinary metal bearings secured to the beams B.

D D' are gear-wheels fixed to the opposite ends of the shaft $d$ and arranged to mesh with gear-wheels C C', fixed to a shaft, $c$, having ordinary metal bearings secured to the beams B B.

G and $G^2$ are levers pivotally secured to the transverse beam $B^3$ by the projections $b^4$ of the beam-caps $b^3$, which serve as fulcrums therefor.

F F' are pitmen connected to the gear-wheels C C' by wrists, as shown at $f$, Fig. 1, and to the levers G $G^2$, the corresponding ends of which are bifurcated for their reception, and also perforated for the reception of bolts $f'$ $f^2$, which connect the pitmen F F' with the levers G $G^2$. The bodies of the levers G $G^2$, opposite to their ends affixed to the pitmen F F', are provided with opposite outward curves, $g^2 g^4$, which are connected by integral parts corresponding in formation to journal-caps $g^3 g^5$, bolted thereto, as shown, and thereby provide the levers G $G^2$ with slotted extensions G' $G^3$, having journals fitted to the boxes formed by the caps $g^3 g^5$ and the parts to which they are connected in a manner to allow the slotted extensions G' $G^3$ to move therein, as hereinafter explained.

As more fully shown in Figs. 3 and 4, K is a frame, made either of wood or metal and provided at its sides with shafts $J^2$ $J^3$, supported by journal-boxes $d'$ $d'$ and $d^2$ $d^2$, and at its top with shaft P, having bearings in journal-boxes P' $P^2$.

N N' are crank-disks, and J J' are momentum-wheels secured to opposite ends of the shafts $J^2$ $J^3$.

$P^3$ is a crank-disk fixed to the shaft P, having a band-wheel, Q, for a purpose hereinafter set forth.

The crank-disks N N' are provided with double wrists $n$ $n'$, and the crank-disk $P^3$ is provided with a treble wrist, $P^4$.

R R' represent pitmen connected to the crank-disk $P^3$ by means of the treble wrist $P^4$ and to the crank-disks N N' by means of the double wrists $n$ $n'$, as more fully shown in Fig. 4.

S represents a pitman connecting the crank-disks N N' by means of their double wrists $n$ $n'$.

H $H^2$, more fully shown in Fig. 1, are pitmen having bifurcated upper ends, H' $H^3$, for the reception of the slotted ends G' $G^3$ of the levers G G², to which they are connected by transverse bolts $h^2\ h^3$, affixed thereto through the slots shown in the parts G' G³. The pitmen H H² connect the levers G G² with the momentum-wheels J J' by means of wrists $h\ h'$, intermediate with which and the upper ends of the pitmen is a guide-frame, L, having an arm, $l'$, bolted to the frame-piece K' at $l^2$, and curved arms L², bolted to the top of the frame K, as shown. The guide-frame is provided at its ends with slots L' L', through which the pitmen H H² are connected to the levers G G², and momentum-wheels J J'.

The mechanism is to be put in motion by a steam-engine, connected by means of its pitmen with the wrist shown at P⁴, Figs. 3 and 4, or connected by means of a belt with the pulley Q on shaft P. (Both fully shown in Fig. 3.)

The frame K may be provided with rearward projections suitably arranged for supporting a steam-engine for connecting with the wrist P⁴, and driving the mechanism; or the shaft P may be made a double crank-shaft, and the engine connected therewith from a suitable supporting-base within the frame K, which may also be provided with boiler or battery for supplying the engine with steam.

The operation is as follows: Motion given to the shaft P will be communicated to the shafts J² J³ and momentum-wheels J J' through pitmen R R' and S, the latter of which will insure the shafts J² J³ and momentum-wheels J J' moving in the same direction. The rotation of the momentum-wheels J J' will give reciprocal motion to the levers G G², through the pitmen H H², the upright positions of which will be additionally secured by the slotted parts L' of the frame D. As the wheels J J' revolve the lever parts G' G², being articulated to the curved parts of the lever G G², will oscillate correspondingly in their boxes, and thus allow suitable and easy motion to the pitmen H H². The levers G G² will give motion to the gear-wheels C C', and through the pinions D D' to the band-wheel E, from which the motion can be transmitted by a belt to a thrasher or other machinery. The momentum of the wheels J J' will act efficiently in connection with the engine on the levers G G², by means of which the power expended may be economically employed.

The levers G G² may be disconnected from the pitmen H H², or the latter from the momentum-wheels J J', when necessary to transport the mechanism from one place to another, when the frame K and the parts affixed and supported thereby are to be mounted on a suitable vehicle; or it may be provided with transporting-wheels and draft mechanism, and moved from place to place in the same manner as the parts connected to the frame and transporting-wheels shown in Figs. 1 and 2. When the mechanism is to be put in operation, the frame K is to be rigidly secured in position by guy chains or rods connected thence with stakes in the ground, and the relative positions of the parts mounted on the transporting-wheels also secured by guy rods or chains applied in a similar manner, and other suitable means. Such guy rods or chains are not shown in the drawings, as no claims are made to such features.

Having explained the construction and operation of my improvement, what I claim as new, and desire to secure by Letters Patent, is—

1. The levers having slotted ends articulated to their bodies, as shown, in combination, with the pitmen and gear-wheels arranged to operate a band-wheel, as specified, the frame provided with momentum-wheels arranged to operate as described, and the intermediate pitmen connecting the motion of the parts, as and for the purpose set forth.

2. The combination of the pitmen angularly connected to the crank-disk on the driving-shaft, and the crank-disks on the shafts provided with the momentum-wheels, and the longitudinal pitman connected to the crank-disks on the shafts provided with the momentum-wheels, arranged to operate as and for the purpose set forth.

3. The guide-frame affixed to the rear supporting-frame, in combination with the latter, and the pitmen connected to the momentum-wheels, and levers arranged to operate the band-wheel, as and for the purpose set forth.

In testimony whereof I affix my signature in presence of two witnesses.

ZUANGLE R. FERGUSON.

Witnesses:
 WM. WENDEL,
 CARL W. BIERSACH.